A. K. ENGELSON.
DRAFT EQUALIZER.
APPLICATION FILED SEPT. 6, 1918.

1,311,058. Patented July 22, 1919.

Albert K. Engelson, Inventor

By Geo. P. Kimmel, Attorney

UNITED STATES PATENT OFFICE.

ALBERT K. ENGELSON, OF CANBY, MINNESOTA.

DRAFT-EQUALIZER.

1,311,058. Specification of Letters Patent. Patented July 22, 1919.

Application filed September 6, 1918. Serial No. 252,837.

*To all whom it may concern:*

Be it known that I, ALBERT K. ENGELSON, a citizen of the United States, residing at Canby, in the county of Yellow Medicine and State of Minnesota, have invented certain new and useful Improvements in Draft-Equalizers, of which the following is a specification.

This invention relates to draft appliances for horse drawn vehicles and more particularly to an improved draft equalizer adapted to be employed where one or more horses are disposed one ahead of the other.

More particularly, the invention comprises a four-horse evener whereby a team connected to a draft tongue may be arranged to pull equally with two horses pulling ahead of the same.

With the above and other objects in view, my invention comprises the novel features of construction, combinations of elements and arrangement of parts which will be more fully described in the following specification and then finally embodied in the clauses of the claim which are appended to this specification and which form an essential part of the same.

Reference is had to the accompanying drawing forming a part of this application wherein like characters of reference will designate corresponding parts throughout the several views, in which—

Figure 1:
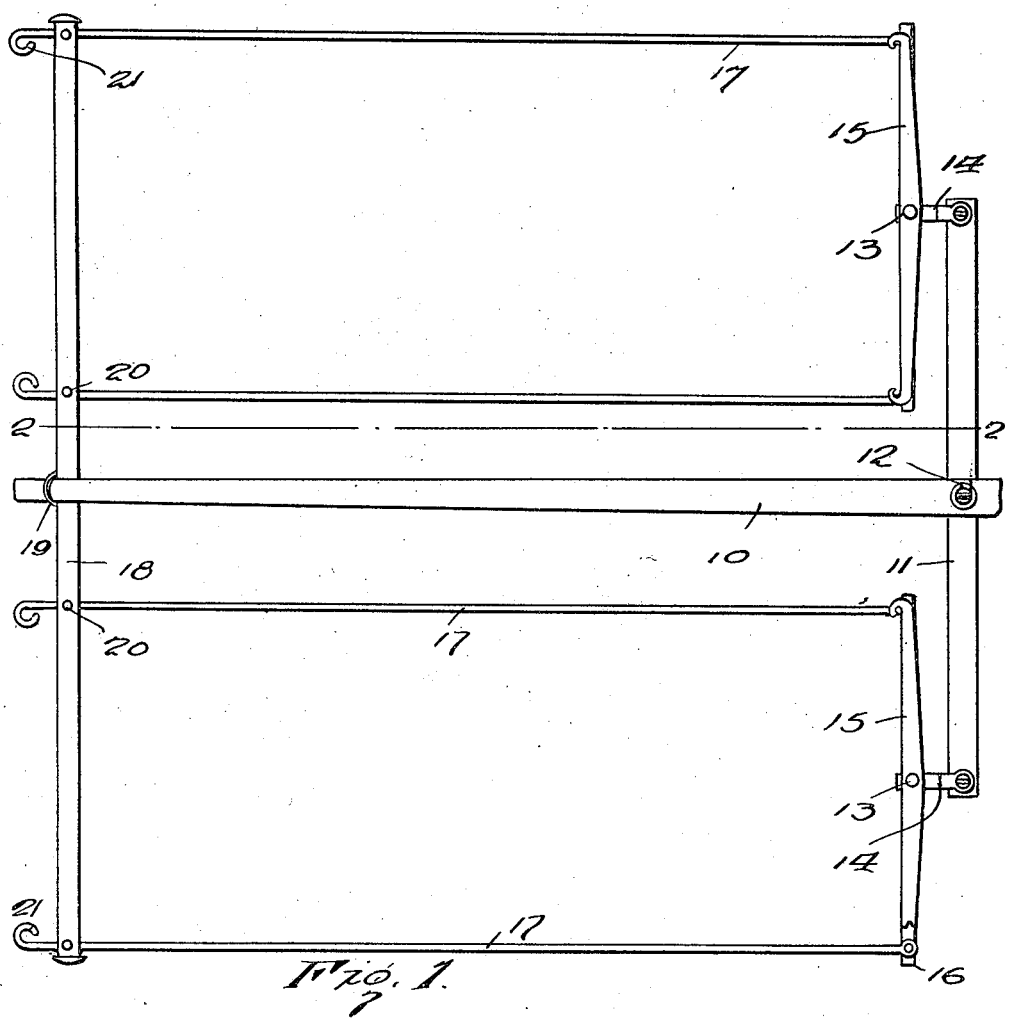
Figure 2:
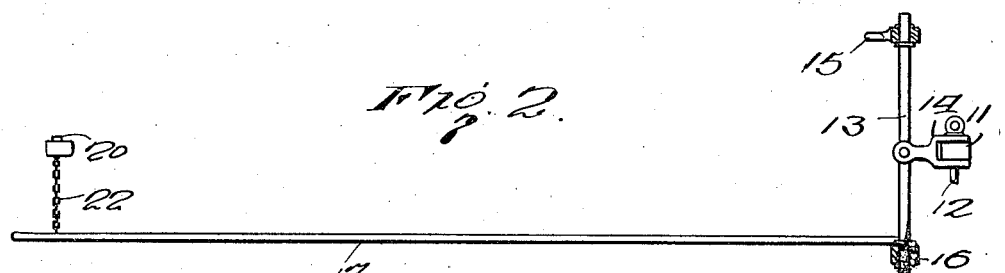

Figure 1 is a plan view of my improved four-horse draft evener or equalizer, and Fig. 2 is a sectional view taken on the line 2—2 of Fig. 1.

Referring to the drawings in detail, the numeral 10 designates the draft pole or tongue of a wheeled vehicle designed to be suitably connected at its rear end to the same and carrying thereon, a whiffle tree 11 which is pivoted as shown at 12 to the tongue and designed to exert draft strain thereat.

Mounted upon each end of the whiffle tree 11 and extending vertically, is an upright equalizing bar 13, the same being connected to the whiffle tree through the medium of links 14 disposed at the ends of the whiffle tree and equidistantly between the upper and lower ends of the uprights. These uprights are made preferably of metal of sufficient strength to prevent buckling or bending thereof when draft strain is exerted thereon.

Attached to the upper ends of the uprights 13, are swingle trees 15 to which the rear draft animals are connected. Attached to the lower ends thereof are swingle trees 16, from the ends of which metallic rods 17, forming traces, extend, so as to accommodate the rear draft animals therebetween at either side of the tongue.

Mounted upon the forward end of the tongue is a neck yoke 18 designed to accommodate both animals between the traces 17, the same having a collar 19 for connection with the tongue and having connection at 20 with the traces 17, which latter are preferably made of metal of sufficient strength to withstand the strain exerted thereon, as well as to be as light as possible. The forward extremities of the traces 17 are formed at 21 to connect the forward draft animals thereto, suitable chains or other connections 22 being provided to support the traces from the yoke so that the lead horses may be connected in front of the rear horses and by reason of the equalizer bars or uprights 13, to insure that equal pull shall be exerted by both the rear and lead draft animals.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. A four-horse draft equalizer comprising the combination with a whiffle tree, uprights mounted on the ends thereof, said uprights being pivoted intermediately of their ends, swingle trees connected to the upper ends thereof, swingle trees connected to the lower ends thereof, and traces extending forwardly from said lower swingle trees to be disposed upon either side of the rear draft animals connected to the upper swingle trees and serving for connection with the forward draft animals thereto forwardly of the rear draft animals.

2. In a draft equalizer, the combination with a draft tongue, a whiffle tree mounted thereon, uprights pivoted equidistantly between their top and bottom ends to said whiffle tree at the extremities thereof, swingle trees connected to the upper ends of said uprights, swingle trees connected to the lower ends of said uprights, rigid traces connected to the extremities of the last named swingle trees, a yoke connecting and supporting said traces, means connecting said yoke to said tongue.

3. The combination with a draft member, of uprights pivoted intermediately to the same, a swingle tree pivoted to one end of said uprights, a swingle tree pivoted to the other end, and rigid traces connected to the ends of one of said swingle trees.

In testimony whereof I affix my signature hereto.

ALBERT K. ENGELSON.

Copies of this patent may be obtained for five cents each, by addressing the "Commissioner of Patents, Washington, D. C."